United States Patent
Jackel et al.

[11] Patent Number: 6,148,740
[45] Date of Patent: Nov. 21, 2000

[54] LOAD CARRYING LIGHTWEIGHT PALLET FOR SPACECRAFT

[75] Inventors: Roland Jackel, Bremen; Ortwin Golbeck, Hude, both of Germany

[73] Assignee: DaimlerChrysler Aerospace AG, Ottobrunn, Germany

[21] Appl. No.: 09/433,661

[22] Filed: Nov. 4, 1999

[30] Foreign Application Priority Data

Nov. 4, 1998 [DE] Germany ............................ 198 50 699

[51] Int. Cl.$^7$ .................................................. B65D 19/38
[52] U.S. Cl. ..................................... 108/57.32; 108/51.11
[58] Field of Search ................................ 108/55.5, 55.1, 108/55.3, 51.11, 57.32, 57.3

[56] References Cited

U.S. PATENT DOCUMENTS

| | | | |
|---|---|---|---|
| 2,720,323 | 10/1955 | Hoiles | 108/51.11 X |
| 3,592,145 | 7/1971 | Petry | 108/57.32 X |
| 4,077,532 | 3/1978 | Bryan | 108/55.3 X |
| 4,690,360 | 9/1987 | Looker | 108/57.32 X |
| 5,720,229 | 2/1998 | Schrage | 108/55.5 |
| 5,809,907 | 9/1998 | Bumgarner | 108/57.32 X |
| 5,894,803 | 4/1999 | Kuga | 108/51.11 |

*Primary Examiner*—Jose V. Chen
*Attorney, Agent, or Firm*—W. F. Fasse; W. G. Fasse

[57] ABSTRACT

A lightweight pallet especially for holding payloads in a spacecraft has a sandwich construction with a core grid of longitudinal carrier beams and cross-connectors mounted between a top flat sheet metal plate and a bottom flat sheet metal plate and a bottom sheet metal plate. A cross-beam is secured to the front end and to the rear end of the pallet. The cross-beams carry journal pins for mounting the pallets to respective yokes in the cargo bay of a spacecraft. The cover plates are provided with cut-outs forming square or rectangular holes with rounded corners. Hole patterns or threaded holes are provided for the connection of junction plates and payloads to the pallet. The junction plates are secured where the longitudinal beams and the cross-connectors meet. At least one of the two laterally outer longitudinal beams has a recess for the recessed mounting of payload supply unit such as a power supply. The recess is then closed again by a plate capable of taking up shear stress. The longitudinal beams and the cross-connectors are essentially hollow except for cross-ribs connecting the chords of the longitudinal beams and cross-trusses in a box frame of the cross-connectors.

10 Claims, 6 Drawing Sheets

LOAD CARRYING LIGHTWEIGHT PALLET FOR SPACECRAFT

PRIORITY CLAIM

This application is based on and claims the priority under 35 U.S.C. §119 of German Patent Application 198 50 699.6, filed on Nov. 4, 1998, the entire disclosure of which is incorporated herein by reference.

FIELD OF THE INVENTION

The invention relates to a lightweight pallet for holding heavy loads particularly in spacecraft. Such pallets have a sandwich structure with an upper cover plate and a lower cover plate made of sheet metal and connected to each other by a grid structure.

BACKGROUND INFORMATION

Conventional pallets are used in spacecraft for transporting payloads into outer space, for example to a space station or for transporting payloads back to earth from a spacecraft or station. For this purpose the payloads are either rigidly or releasibly secured to the pallets. The pallets in turn are mounted in the spacecraft generally in a so-called space shuttle. The mounting of the pallet in the cargo bay of the shuttle is usually accomplished by a yoke or bail and a number of journal bearing pins for securing the pallet to the bail.

One type of conventional pallet particularly constructed for the above purpose has an upper milled structure and a lower milled structure. These two milled structures are connected to each other by spacers and tension bolts. Sheet metal members for transmitting shearing forces effective on the pallet are installed between the upper and lower milled structure. These shearing force transmitting sheet metal members are either screwed or riveted to the milled structures.

Another conventional type of such pallets includes longitudinal carrier beams usually produced as extrusion sections, and interconnected by short cross-beam sections. Payload securing elements are integrated into the longitudinal extrusion sections or beams.

A third known pallet has a structure made of a multitude of angular members, sheet metal sections, and other semi-finished components which are secured to one another by screws and rivets. Such a structure requires auxiliary plates that are screwed to the pallet between the beams for securing the payload and for increasing the stiffness or rigidity of the entire pallet.

The just described conventional pallets have a relatively small rigidity or stiffness and a construction or layout that does not always provide the required strength at specific points where it is needed. Conventional pallets are relatively heavy which reduces the payload. Conventional pallets have a low resonance frequency which is undesirable for space flight missions where resonance vibrations must be avoided. Yet another drawback is seen in the fact that the complicated pallet construction contributes to the manufacturing and assembly costs at least in certain instances. For example, the machining of milled structures out of thick solid plates is expensive as well as time consuming, particularly where more than 95% of the material must be removed by milling. Furthermore, a milling operation, especially where large volume portions are removed, can result in stress concentration locations within the pallet, whereby the possible payload is substantially reduced for such a pallet. The connection of structural components by means of spacers and tension bolts is not only difficult and time consuming, it also provides a pallet, the structure of which is not ideally adapted to the load requirements to which such a pallet is exposed. On the other hand, the riveting or screwing of shear take-up plates on both sides of a milled structure having a U-cross-sectional configuration is not advantageous in view of the denting characteristics of such shear plates. Further, it is difficult to secure the shear plates to U-sectional stock, especially to the open side of such stock.

European Patent Publication EP 0,199,513 A2 discloses a lightweight structural pallet which avoids at least some of the above outlined drawbacks. The known pallet disclosed in the just mentioned European Patent Publication is constructed for air freight carrying and is made completely of aluminum, whereby the known pallet has a relatively low mass (weight) and provides an increased mechanical strength. However, even this improved air freight pallet leaves room for improvement.

OBJECTS OF THE INVENTION

In view of the foregoing it is an aim of the invention to achieve the following objects singly or in combination:

to provide a lightweight construction pallet for load transportation especially in space, that has an improved strength and stiffness characteristic, particularly a substantially improved strength to dead weight ratio compared to the prior art;

to construct such a pallet so that its strong points are positioned where loads are concentrated;

to avoid weak points in the pallet, particularly where load forces are introduced into the pallet;

to make the basic structure of the pallet easily adaptable to different payloads simply by modifying the cover elements specifically the load securing elements while maintaining the basic structure; and to generally avoid the above drawbacks of the prior art.

SUMMARY OF THE INVENTION

The pallet according to the invention is characterized by a sandwich structure including a grid core between a bottom cover sheet metal plate and a top cover sheet metal plate. The core grid includes longitudinal beams interconnected by cross-connectors. The longitudinal beams have upper and lower chords interconnected by ribbed webs. The cross-connectors also have chords interconnected by a cross-truss structure. The pallet front and rear ends are closed by respective cross-beams extending in parallel to the cross-connectors. The top and bottom cover plates are preferably perforated. Preferred cross-connectors have a box frame with diagonal cross-trusses.

The just described combination of features provides a pallet that can be constructed of modular elements in different sizes. These modular elements are modular elements that locate the strength of the pallet in those points of the pallet where a safe load acceptance is critical. Only a few modular components are required, whereby the components of a group are identical to one another. For example, all the longitudinal carrier beams are identical. Similarly, all the cross-connectors are identical. An important advantage of the present pallet is seen in that weak points or transitions between pallet components are avoided where force lines caused by loads are introduced into the pallet. Further, present pallet components are premanufactured with a minimum of milling operations, whereby a cost effective production is possible using flat sheet metal. The milling of the cross-connectors requires a removal of a small volume compared to the total volume of a prefabricated blank for making the cross-connectors. By simply selecting different thicknesses of the top and bottom sheet metal cover plates, it is easily possible to adapt the pallet to payloads having different masses or weights.

The present pallet can be produced, in spite of its optimized lightweight construction, of very simple components such as sheet metal, prefabricated sections or extrusion sections made of materials already certified for space travel purposes. As a result, further certifications, for example for pallets of different sizes, are no longer required. Moreover, proof that pallets of different strengths meeting the official strength requirements is easily provided even if cover plates of a different thickness are employed to accommodate a different payload. In that case it is merely necessary to enter the respective sheet metal characteristics such as the different thicknesses of the cover plates into a single finite elements model to quickly and economically provide the required proof. A costly new modelling of the pallet is not necessary when the payload is changed, whereby substantial structure strength verification costs can be saved.

The above-mentioned modular construction of preassembled elements further reduces the costs of the present pallets. For example, longitudinal carrier beams can be preassembled and two of such beams forming outer beams of the pallet are first interconnected at their ends to form a frame into which further beams are then inserted. Such a construction method makes it easy to adapt the lightweight pallet size individually to the requirements of any particular space flight mission.

BRIEF DESCRIPTION OF THE DRAWINGS

In order that the invention may be clearly understood it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

Figure 1:
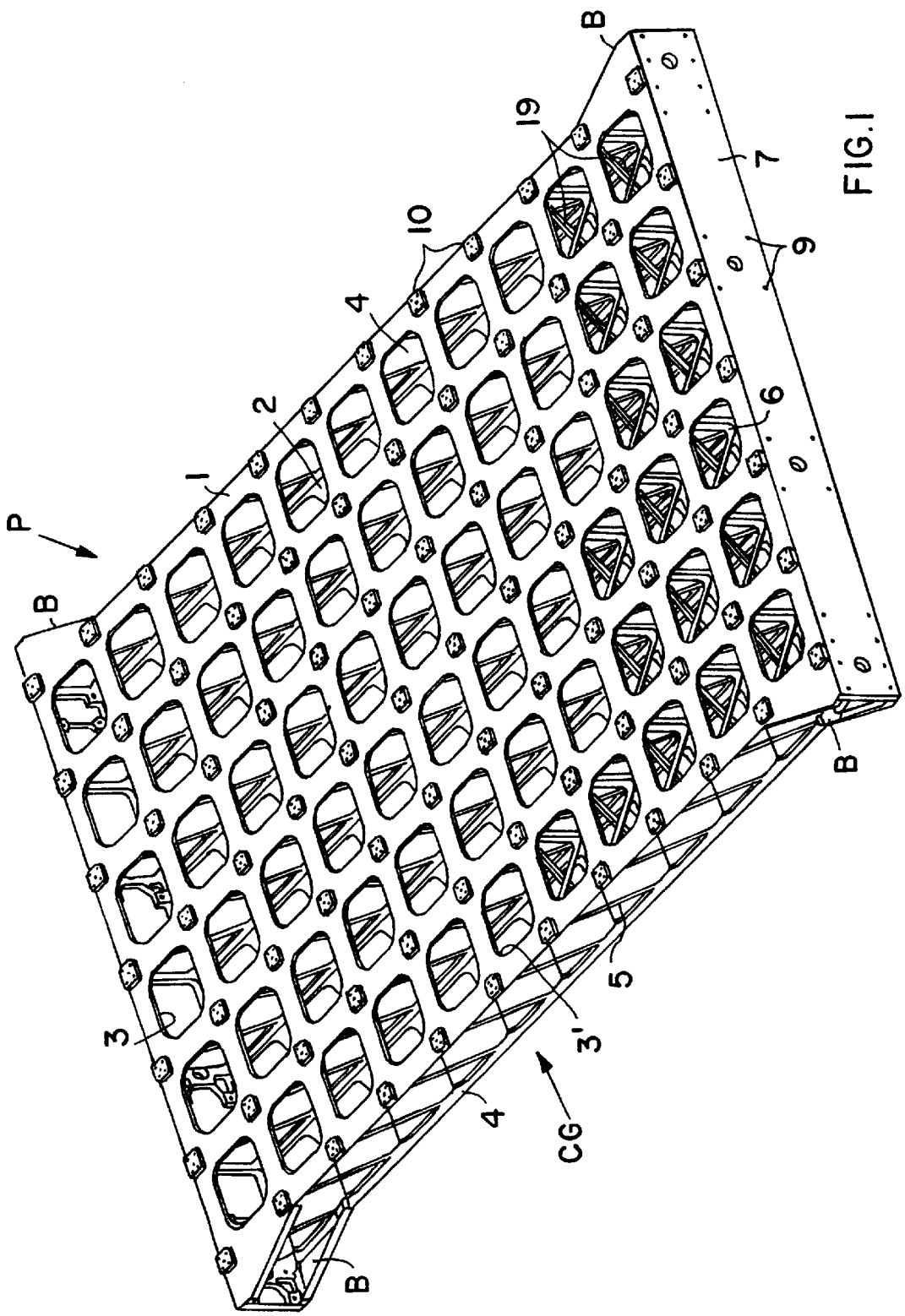
FIG. 1 is a perspective view of a lightweight pallet constructed according to the invention with a front end closing beam and a rear end closing beam.

FIG. 1 shows a pallet P according to the invention with a flat sheet metal top cover plate 1 and a flat sheet metal bottom cover plate 2. A core grid CG is sandwiched between the cover plates 1 and 2. The top and bottom surfaces of the pallet P are particularly exposed to tension and pressure loads and these loads are primarily taken up by the cover plates 1 and 2 which are of identical construction. Each cover plate is provided with substantially rectangular cut-outs 3 for weight reduction. Each cut-out 3 has preferably a square or rectangular configuration with rounded corners 3' for an improved stress distribution.

Figure 3:
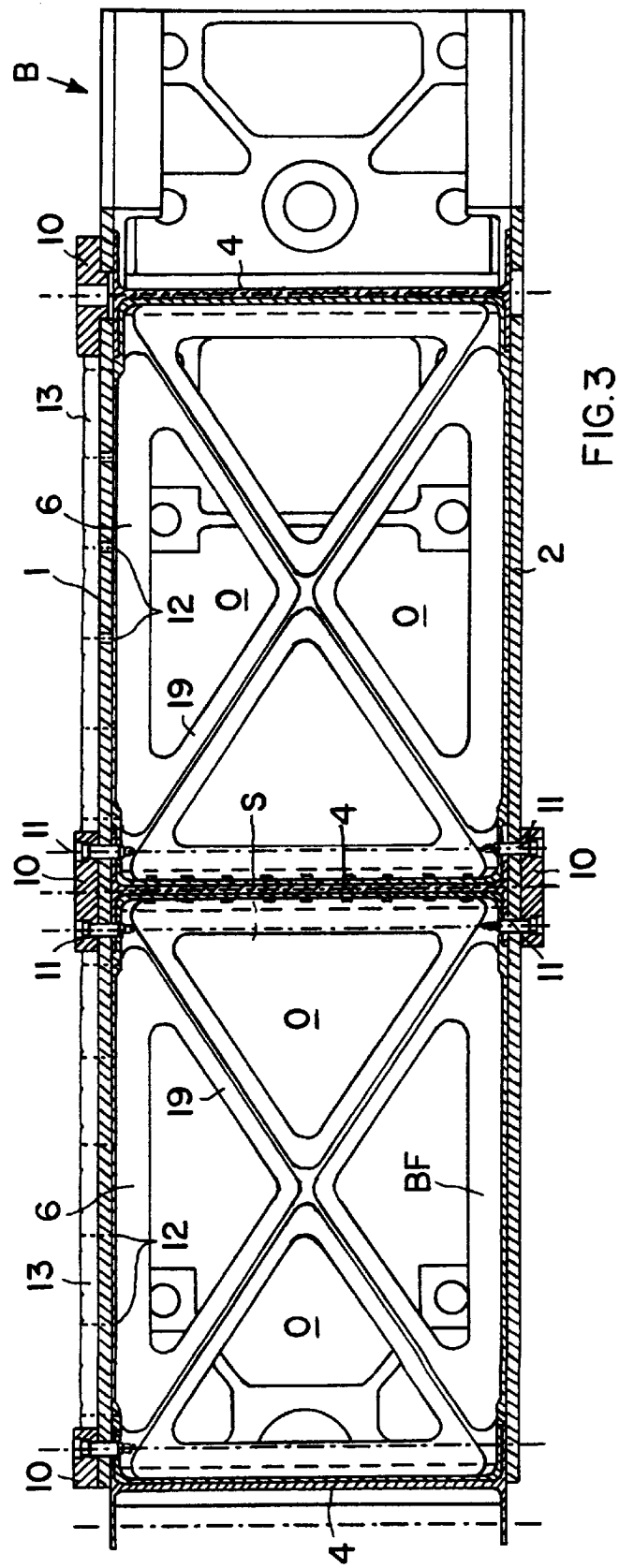
FIG. 3 shows on an enlarged scale and partially in section a view onto the cross-connectors substantially in the direction of the arrow III in FIG. 2.

The core grid CG to which the cover plates 1 and 2 are secured, comprises longitudinal carrying beams 4 laterally interconnected by cross-connectors 6 best seen in FIG. 3. The connection of the cover plates 1 and 2 to the core grid CG can be accomplished in several ways, for example by screws, rivets, adhesive bonding, or welding. The longitudinal carrier beams 4 in the shown example have an I-beam cross-sectional configuration. However, the invention is not limited to the use of such sectional stock. The longitudinal beams are manufactured of semi-finished sectional stock for example, extruded sections or simply sheet metals, whereby an economic manufacture is achieved.

Figure 2:
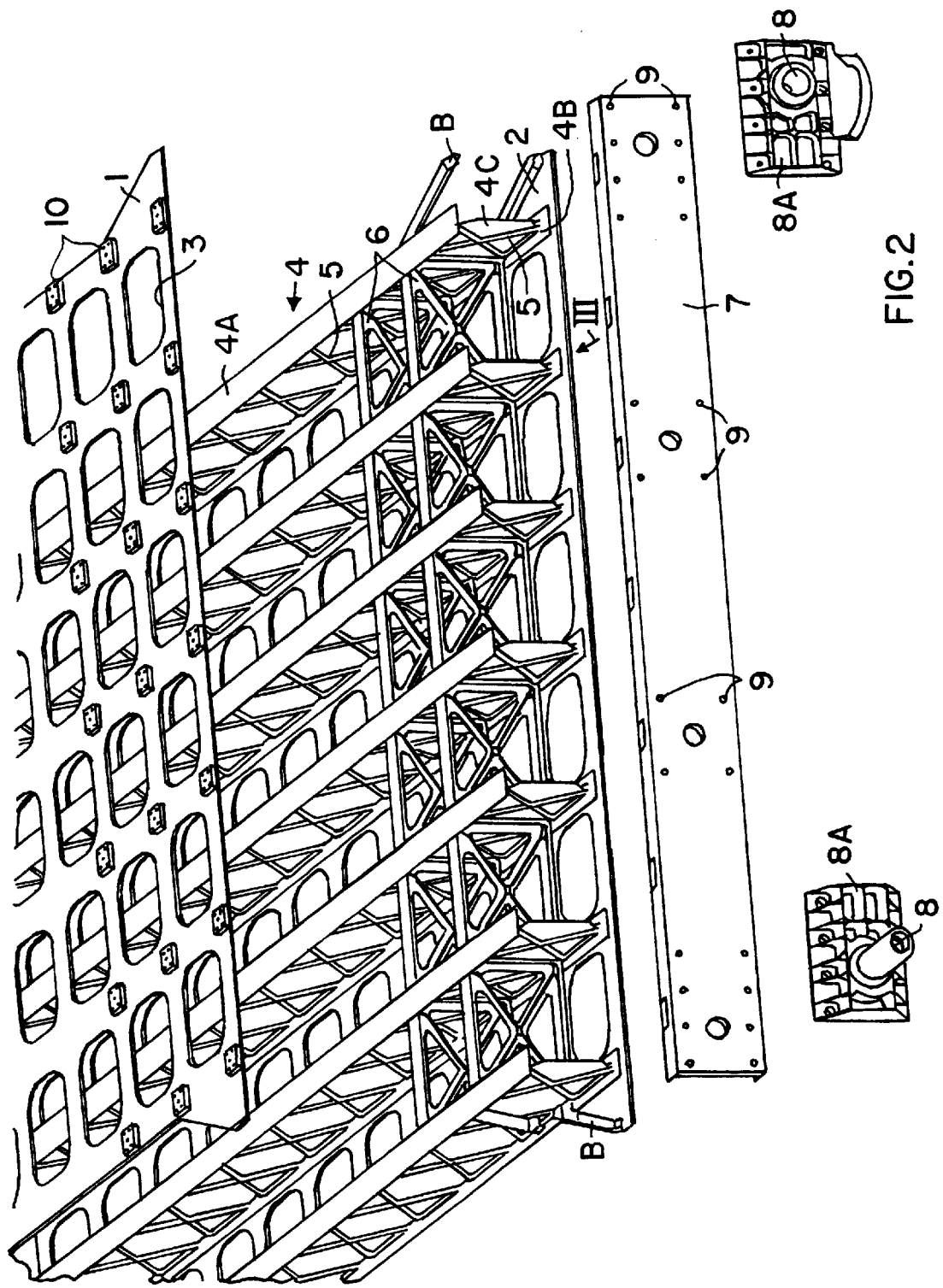
FIG. 2 is a perspective, partly exploded view of the pallet of FIG. 1 with the front end closing beam and the top cover plate not yet secured to the core grid.

FIG. 2 shows the structure of the longitudinal beams 4 between the cover plates 1 and 2 in more detail. The beam structure has a configuration that has been optimized with regard to achieving a stiff shear resistance of each beam while simultaneously obtaining a minimal structural mass. For this purpose each beam 4 has top and bottom chords 4A and 4B interconnected by thin sheet metal webs 4C reinforced at uniform spacings along the beam by cross-ribs 5 to provide the required shear strength, whereby the cross-ribs 5 increase the critical buckling strength or stress.

As shown in FIGS. 2 and 3 the longitudinal beams 4 are interconnected by the cross-connectors 6 having a box frame BF with four sides reinforced by diagonal cross-truss 19. The box frame BF of the cross-connectors 6 is secured to the webs of the longitudinal beams 4 by screws S passing through the webs of the longitudinal beams 4 and by screws 11 passing through junction plates 10 that secure the top cover plate 1 and the bottom cover plate 2 to the core grid CG and to the box frames BF of the cross-connectors 6. The invention, however, is not limited to the use of screw connections. Rivets, adhesive bonding, or welding may be employed for the connection of the cross-connectors 6 to the longitudinal beams 4. In the shown example embodiment the cross-connectors 6 are milled or machined elements, whereby the machining forms the cross-trusses 19. However, stamped sheet metal cross-connectors may be used instead. In both instances the cross-connectors 6 which are primarily exposed to tension and/or pressure loads provide an especially stiff, yet low mass connector element between the longitudinal carrier beams 4, whereby the entire pallet achieves a high resonance frequency. Loads that are concentrated on one longitudinal carrier beam 4 are distributed by the cross-trusses 19 of the cross-connector 6 onto neighboring longitudinal beams 4. Openings O formed by the cross-trusses 19 in the box frames BF of the cross-connectors 6 are longitudinally aligned with one another in the grid structure GS and are thus particularly suitable for the installation of conductors such as electrical conductors for supplying required services to the payloads, for example heating. Each of the cross-connectors 6 can be readily produced as a mass production item at relatively economic costs using small semi-finished products.

Figure 6:
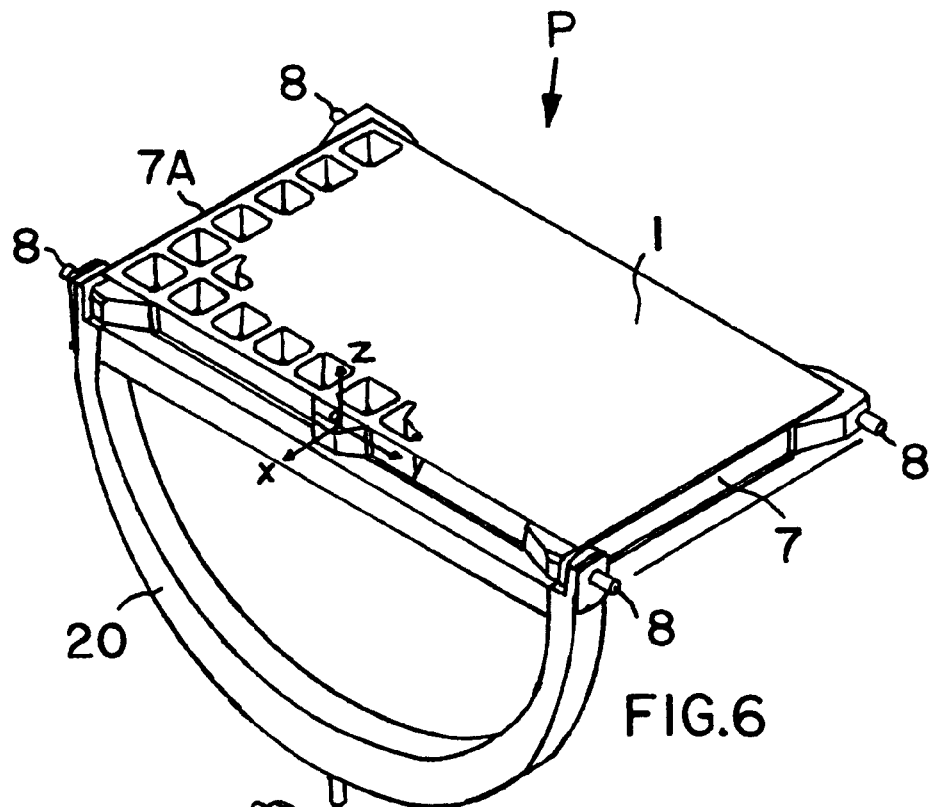
FIGS. 6 and 6A show the present pallet journalled in a mounting bail or yoke in different angular positions relative to a three-dimensional coordinate system.
Figure 6A:
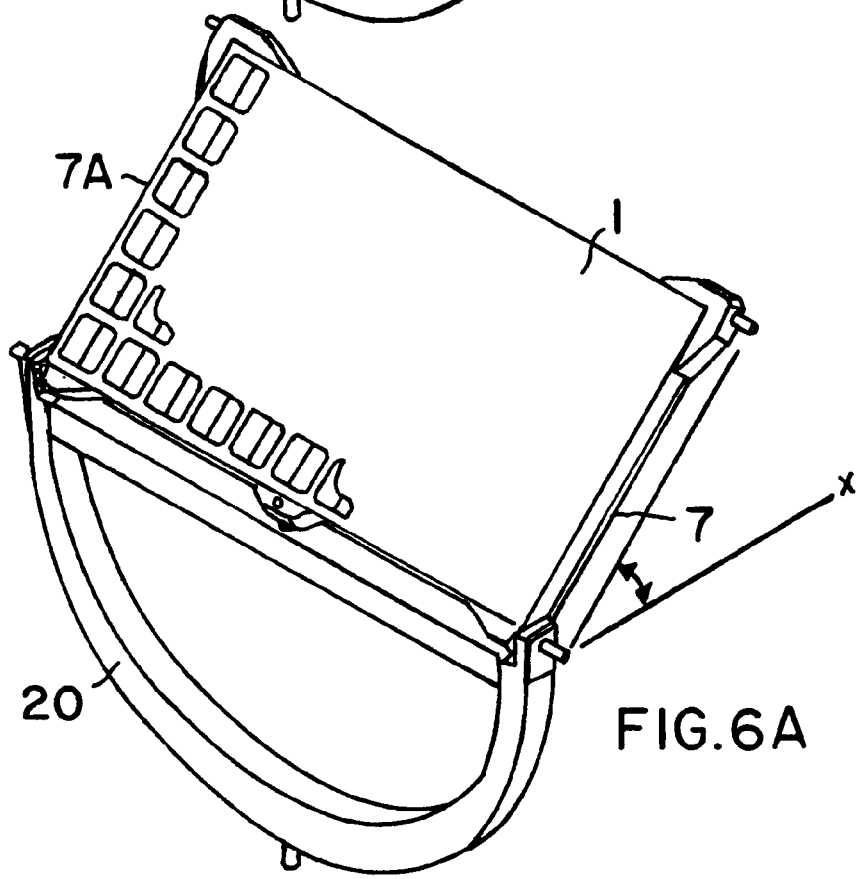

Referring again to FIGS. 1 and 2, the front end of the pallet P is closed by a front cross-beam 7 while the rear end of the pallet is closed by a cross-beam 7A. These cross-beams are identical to each other. The cross-beams 7 and 7A are also shown in FIGS. 6 and 6A. These cross-beams 7, 7A are of rigid construction for transferring loads from the pallet into journal pins 8 secured to journal bearing mountings 8A shown in FIG. 2. These mountings 8A are secured to the cross-beams 7, 7A in different positions. For this purpose, the cross-beams are provided with hole patterns 9. The bearing mountings 8A are provided with respective hole patterns so that screws passing through the hole patterns of the bearing mountings 8A will fit into the various hole patterns 9 in the cross-beams.

As shown in FIG. 1 and in more detail in FIG. 3, mounting brackets B are secured to each corner of the pallet P specifically to the ends of the laterally outer longitudinal beams. The mounting brackets B facilitate the securing of the end cross-beams 7, 7A to the respective pallet ends.

Figure 4:
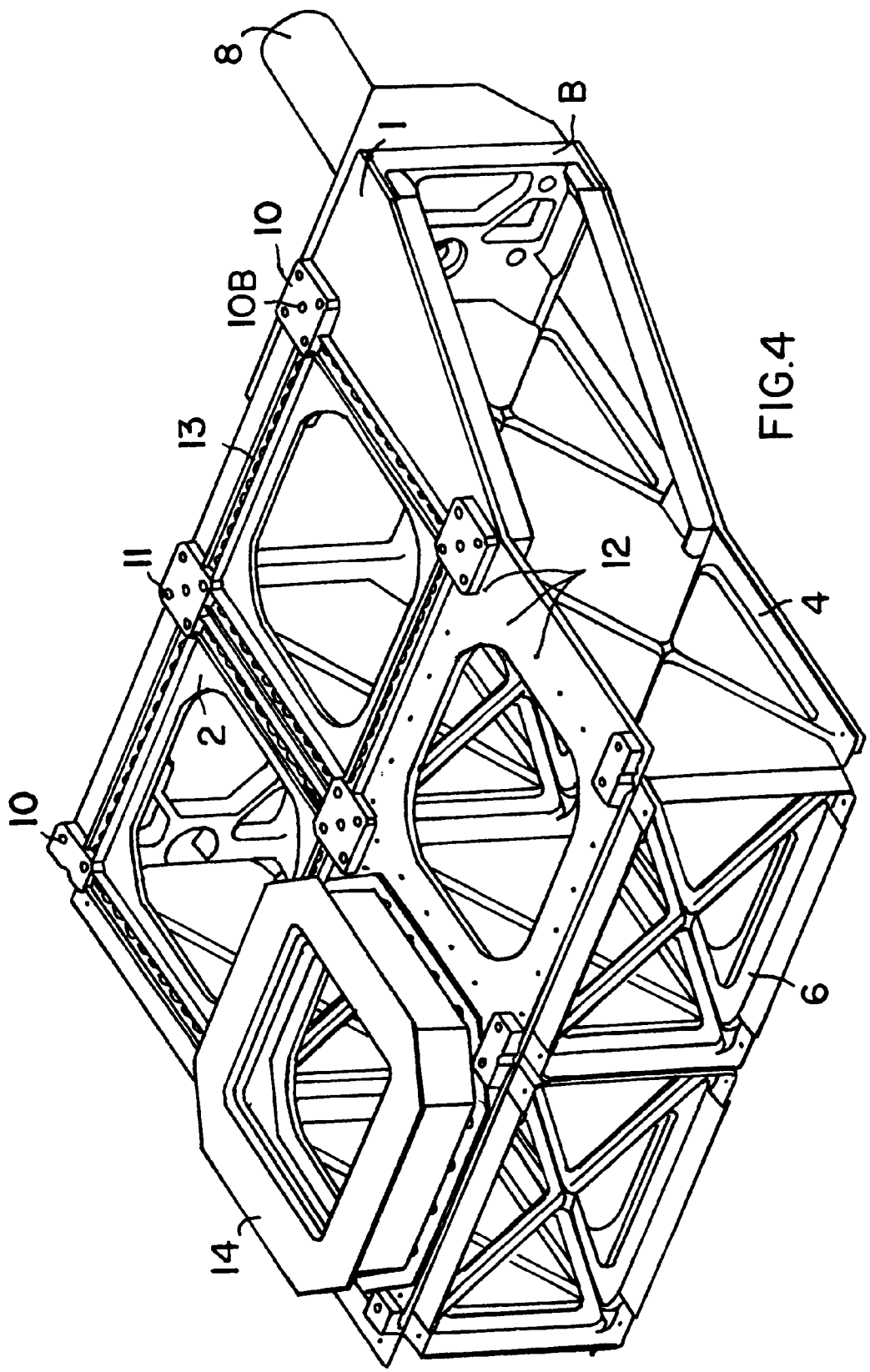
FIG. 4 shows on an enlarged scale a perspective view of a portion of a pallet wherein the top cover plate provided with different load connectors.

The perspective view of FIG. 4 illustrates different connector elements 10, 11, 12, 13 and 14 for the securing of a payload to the pallet. The connector elements 10 are junction plates provided with holes 10B for securing the junction plates 10 to the pallet as also shown in FIG. 3. The connector holes 10B may be screw holes or rather threaded holes or these holes may be formed as a bayonet catch. The junction plates 10 are also easily manufactured as a mass production article. If, for example, the load securing threading in a hole 10B of the junction plate 10 is damaged, the damage is efficiently repaired by exchanging the respective junction plate. When the junction plates 10 are secured to the upper cover plate 1 by screws 11 in respective holes as shown in FIG. 3, the mechanical loads caused by the weight of the payload, are directly introduced into the cross-trusses 19 of the cross-connectors 6. Moreover, the cover plates 1, 2 are reinforced by the junction plates 10 in the areas where the load is introduced into the pallet because the load is secured to the junction plates 10.

FIG. 4 shows also so-called seat tracks 13 that may be bolted to threaded holes 12. Seat tracks 13 as such are known in aircraft construction and are therefore not described in any further detail. FIG. 4 further shows a clamping collar 14 that may be bolted by screws in the threaded holes 12 and serves for clamping a payload to the pallet.

Figure 5:
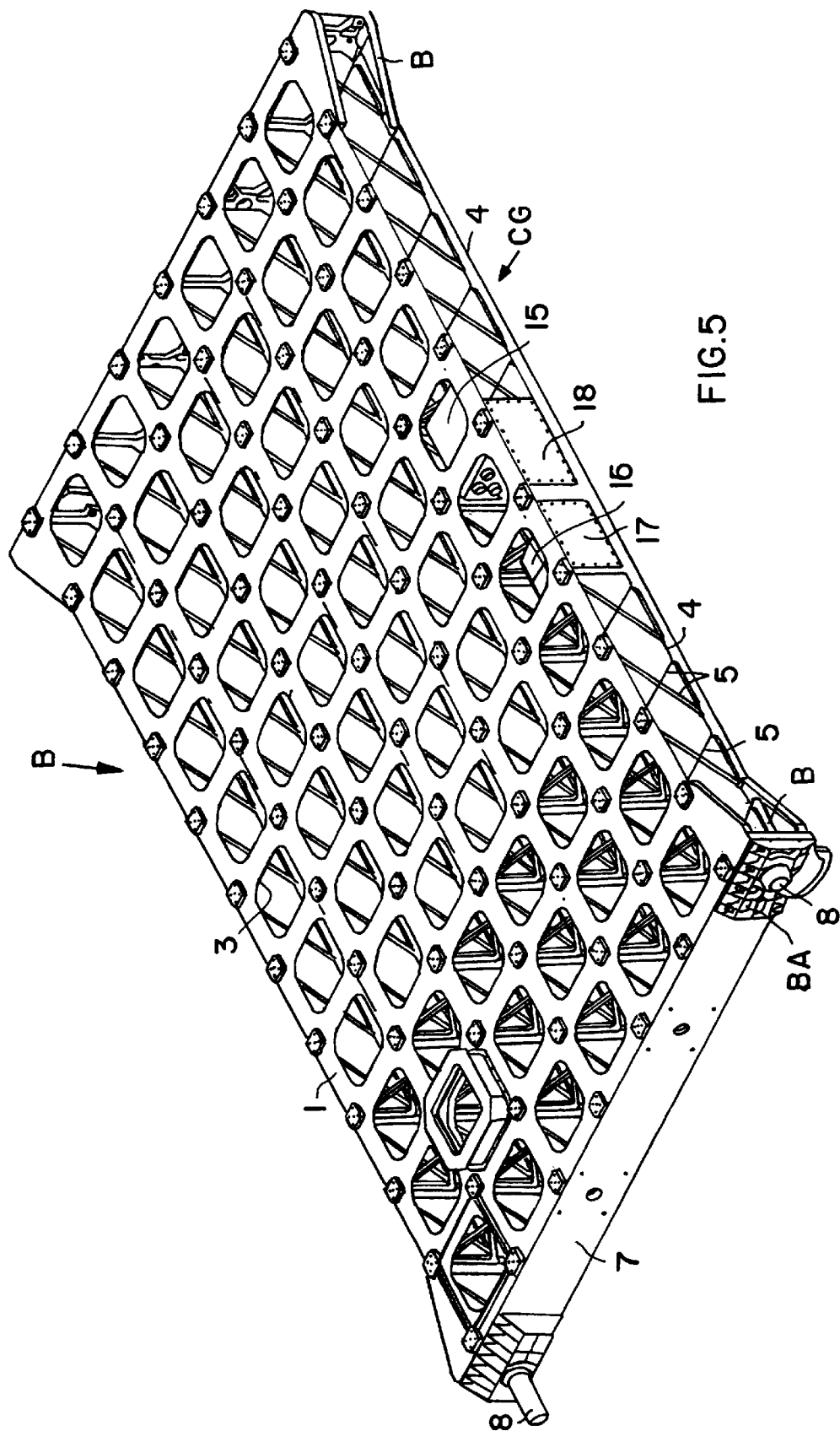
FIG. 5 shows a different perspective view compared to FIG. 1 to illustrate the installation of auxiliary components such as a power supply and/or a computer in the core grid of the pallet.

FIG. 5 shows the mounting of a power supply 15 and/or a computer 16 in the core grid CG of the pallet. For this purpose certain cross-ribs 5 are removed next to a respective compartment between neighboring cross-connectors 6 and neighboring longitudinal beams 4 to provide access for the insertion of the power supply 15 and/or computer 16 into the compartment. After installation the respective compartments are closed again by cover sheet metal members 17 and 18 which are secured to the upper and lower chords of the respective longitudinal carrier beam 4 whereby these members 17, 18 take up shearing stress. The just described lateral installation of components 15 and/or 16 has the advantage that the cover plates 1 and 2 do not have to be disturbed nor weakened. Further, closing the openings where the cross-ribs 5 were removed by the shear take-up plates 17 and 18 restores the original stiffness of the respective longitudinal beam 4.

FIG. 6 shows the mounting of the present pallet P with the aid of a yoke 20 and the journal pins 8 in the cargo bay of a spacecraft such as a shuttle. In FIG. 6 the plane defined by the pallet is oriented in the XY plane of a three-dimensional coordinate system XYZ. In FIG. 6A the pallet is slanted relative to the XY plane. This is possible due to the journal pins 8.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A lightweight pallet for holding a load, particularly in a spacecraft, said pallet comprising a sandwich construction including longitudinal beams (4) and cross-connectors (6) joining said longitudinal beams in a core grid (CG), a first flat sheet metal cover plate (1) secured to one side of said core grid, a second flat sheet metal cover plate (2) secured to an opposite side of said core grid, said longitudinal beams comprising first and second chords (4A, 4B) and ribbed webs (5) interconnecting said chords, each of said cross-connectors (6) comprising cross-struts (19), and end beams (7, 7A) secured to ends of said longitudinal beams (4) and to ends of said first and second cover plates, said pallet further comprising function plates (10) secured to junctions where said longitudinal beams (4) and said cross-connectors (6) meet, and securing means (11) attaching said junction plates (10) to said first and second cover plates (1, 2), to said longitudinal beams (4) and to said cross-connectors (6).

2. The lightweight pallet of claim 1, wherein said ribbed webs (5) and said cross-trusses or struts (19) have openings (O) for an optimal weight reduction and wherein said ribbed webs and cross-trusses or struts are positioned for an optimal pallet strength.

3. The lightweight pallet of claim 1, further comprising journal pins (8) secured to said end cross-beams (7, 7A) for mounting said pallet to a support or yoke (20).

4. The lightweight pallet of claim 1, further comprising at least one payload supply device (15, 16) mounted in said grid structure, a lateral access opening in a lateral side beam of said longitudinal beams forming a longitudinal edge of said pallet, said lateral access opening providing access to said payload supply device (15, 16), and shear stress take-up plates or panels (17, 18) removably secured to said lateral side beam for closing said lateral access opening.

5. The lightweight pallet of claim 1, further comprising rectangular cut-outs (3) in said first and second cover plates (2, 3).

6. The lightweight pallet of claim 5, wherein said cut-outs (3) are square holes having rounded corners (3').

7. The lightweight pallet of claim 1, further comprising load mounting elements (13, 14), hole patterns (12) in said first cover plate (1) forming a top cover plate, and connectors (11) for securing said load mounting elements to said top cover plate by engaging said hole patterns (12).

8. The lightweight pallet of claim 1, wherein said cross-connectors comprise a box frame (BF) and a cross-truss or strut (19) diagonally positioned in said box frame (BF).

9. A lightweight pallet for holding a load, particularly in a spacecraft, said pallet comprising a sandwich construction including longitudinal beams (4) and cross-connectors (6) joining said longitudinal beams in a core grid (CG), a first flat sheet metal cover plate (1) secured to one side of said core grid, a second flat sheet metal cover plate (2) secured to an opposite side of said core grid, said longitudinal beams comprising first and second chords (4A, 4B) and ribbed webs (5) interconnecting said chords, each of said cross-connectors (6) comprising cross-struts (19), and end beams (7, 7A) secured to ends of said longitudinal beams (4) and to ends of said first and second cover plates, and further comprising at least one payload supply device (15, 16) mounted in said core grid, a lateral access opening in a lateral side beam of said longitudinal beams forming a longitudinal edge of said pallet, said lateral access opening providing access to said payload supply device (15, 16), and shear stress take-up plates or panels (17, 18) removably secured to said lateral side beam for closing said lateral access opening.

10. A lightweight pallet for holding a load, particularly in a spacecraft, said pallet comprising a sandwich construction including longitudinal beams (4) and cross-connectors (6) joining said longitudinal beams in a core grid (CG), a first flat sheet metal cover plate (1) secured to one side of said core grid, a second flat sheet metal cover plate (2) secured to an opposite side of said core grid, said longitudinal beams comprising first and second chords (4A, 4B) and ribbed webs (5) interconnecting said chords, each of said cross-connectors (6) comprising cross-struts (19), and end beams (7, 7A) secured to ends of said longitudinal beams (4) and to ends of said first and second cover plates, and further comprising load mounting elements (13, 14), hole patterns (12) in said first cover plate (1) forming a top cover plate, and connectors (11) for securing said load mounting elements to said top cover plate by engaging said hole patterns (12).

* * * * *

UNITED STATES PATENT AND TRADEMARK OFFICE
CERTIFICATE OF CORRECTION

PATENT NO. : 6,148,740

DATED : Nov. 21, 2000

INVENTOR(S) : Jakel et al.

It is certified that error appears in the above-identified patent and that said Letters Patent is hereby corrected as shown below:

On the title page
The inventor's name should read: Jakel et al.

under [75] Inventors: the first inventor's name should read: Roland Jakel, Bremen;

Col. 2, line 66, before "present" insert --the--;

Col. 3, line 26, before "longitudinal" insert --the--;

Col. 6, line 17, after comprising, replace "function" by --junction--.

Signed and Sealed this

Twenty-ninth Day of May, 2001

Attest:

NICHOLAS P. GODICI

Attesting Officer    Acting Director of the United States Patent and Trademark Office